United States Patent
Song

(10) Patent No.: US 12,007,674 B2
(45) Date of Patent: Jun. 11, 2024

(54) TRIAXIAL ROTATION APPARATUS MOUNTED ON AERIAL VEHICLE

(71) Applicant: LG INNOTEK CO., LTD., Seoul (KR)

(72) Inventor: Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1015 days.

(21) Appl. No.: 16/959,645

(22) PCT Filed: Nov. 22, 2018

(86) PCT No.: PCT/KR2018/014438
§ 371 (c)(1),
(2) Date: Jul. 1, 2020

(87) PCT Pub. No.: WO2019/143012
PCT Pub. Date: Jul. 25, 2019

(65) Prior Publication Data
US 2021/0080810 A1 Mar. 18, 2021

(30) Foreign Application Priority Data
Jan. 16, 2018 (KR) .......... 10-2018-0005359

(51) Int. Cl.
*G03B 17/56* (2021.01)
*B64D 47/08* (2006.01)
(Continued)

(52) U.S. Cl.
CPC ......... *G03B 17/561* (2013.01); *F16M 11/125* (2013.01); *F16M 11/126* (2013.01);
(Continued)

(58) Field of Classification Search
CPC ........ F16M 11/121–123; G03B 17/561; B64U 20/87; H01R 35/04; B64D 47/08
See application file for complete search history.

(56) References Cited

U.S. PATENT DOCUMENTS 9,663,244 B2 * 5/2017 Zhao ................ F16M 11/2028
10,432,863 B2 * 10/2019 Appel ................ F16M 13/00
(Continued)

FOREIGN PATENT DOCUMENTS

CN 104456003 A * 3/2015
CN 105517803 A 4/2016
(Continued)

*Primary Examiner* — Leon W Rhodes, Jr.
(74) *Attorney, Agent, or Firm* — Birch, Stewart, Kolasch & Birch, LLP

(57) ABSTRACT

An embodiment of a tri-axial rotation apparatus comprises: a drive part; a first housing which rotates about a first axis and with respect to the drive unit and accommodates a first motor; a second housing which rotates about a second axis, perpendicular to the first axis, and with respect to the first housing, and accommodates a second motor, a third housing which rotates about a third axis, perpendicular to the first axis and the second axis, and with respect to the second housing, accommodates a third motor, and has a camera mounted thereon; a first connection part disposed between the first motor and the first housing along the outer peripheral surface of the first motor; a second connection part disposed between the second motor and the second housing along the outer peripheral surface of the second motor; and a third connection part disposed between the third motor and the third housing along the outer peripheral surface of the third motor, wherein the first connection part, the second connection part, and the third connection part are formed of flexible material and may be electrically connected to the drive part.

12 Claims, 13 Drawing Sheets

(51) Int. Cl.
  *F16M 11/12* (2006.01)
  *F16M 11/18* (2006.01)
  *G03B 15/00* (2021.01)
  B64C 39/02 (2023.01)
  B64U 101/30 (2023.01)

(52) U.S. Cl.
  CPC ........... *F16M 11/128* (2013.01); *F16M 11/18* (2013.01); *G03B 15/006* (2013.01); *B64C 39/024* (2013.01); *B64D 47/08* (2013.01); *B64U 2101/30* (2023.01); *F16M 2200/066* (2013.01)

(56) References Cited

U.S. PATENT DOCUMENTS

| | | | | |
|---|---|---|---|---|
| 10,581,233 | B2 * | 3/2020 | Liu | H04N 23/54 |
| 10,777,987 | B2 * | 9/2020 | Tian | G03B 15/006 |
| 2007/0188734 | A1 | 8/2007 | Waquet | |
| 2014/0037278 | A1 | 2/2014 | Wang | |
| 2016/0255249 | A1 | 9/2016 | Pan et al. | |
| 2017/0174362 | A1 | 6/2017 | Zhao et al. | |
| 2017/0176840 | A1 | 6/2017 | Zhou et al. | |
| 2017/0192338 | A1 | 7/2017 | Sun et al. | |
| 2017/0198747 | A1 | 7/2017 | Chen et al. | |
| 2017/0336019 | A1 | 11/2017 | Liu et al. | |
| 2018/0319512 | A1 | 11/2018 | Kang et al. | |

FOREIGN PATENT DOCUMENTS

| | | | | |
|---|---|---|---|---|
| CN | 105599914 | A | | 5/2016 |
| CN | 205311922 | U | * | 6/2016 |
| CN | 205938393 | U | | 2/2017 |
| CN | 107521714 | A | | 12/2017 |
| JP | 2008-514483 | A | | 5/2008 |
| JP | 6228669 | B2 | | 11/2017 |
| KR | 10-2014-0082695 | A | | 7/2014 |
| KR | 10-2017-0050924 | A | | 5/2017 |
| KR | 10-2017-0068114 | A | | 6/2017 |
| WO | WO 2017/000299 | A1 | | 1/2017 |
| WO | WO 2017/128062 | A1 | | 8/2017 |
| WO | WO-2018000274 | A1 | * | 1/2018 ............ F16M 11/12 |
| WO | WO-2018018635 | A1 | * | 2/2018 ............ B64C 27/04 |

* cited by examiner

TRIAXIAL ROTATION APPARATUS MOUNTED ON AERIAL VEHICLE

CROSS REFERENCE TO RELATED APPLICATIONS

This application is the National Phase of PCT International Application No. PCT/KR2018/014438, filed on Nov. 22, 2018, which claims priority under 35 U.S.C. 119(a) to Patent Application No. 10-2018-0005359, filed in the Republic of Korea on Jan. 16, 2018, all of which are hereby expressly incorporated by reference into the present application.

TECHNICAL FIELD

Embodiments relate to a triaxial rotation apparatus mounted on an aerial vehicle.

BACKGROUND ART

The contents of the disclosure merely provide background information as to embodiments, without constituting prior art.

Recently, use of a small unmanned aerial vehicle such as a drone has been increased. When aerial photographing is performed using a camera mounted on a small unmanned aerial vehicle, there is an advantage of convenience and low costs, as compared to the case wherein a helicopter or the like in which a person rides is used.

In the case in which a camera is mounted on an aerial vehicle, a triaxial rotation apparatus may be used to prevent the camera from being influenced by triaxial rotation because the aerial vehicle may perform tri-rotation at a certain angle during flight.

The triaxial rotation apparatus compensates for triaxial rotation of the aerial vehicle and, as such, the camera mounted on the aerial vehicle may be prevented from being influenced by triaxial rotation of the aerial vehicle.

The triaxial rotation apparatus may be used in a state in which the triaxial rotation apparatus is mounted on the aerial vehicle, and the camera is mounted on the triaxial rotation apparatus. To this end, it is important for the triaxial rotation apparatus to have a small and light structure while having a camera posture maintenance performance.

DISCLOSURE

Technical Problem

Therefore, embodiments relate to a triaxial rotation apparatus mounted on an aerial vehicle.

It will be appreciated by persons skilled in the art, to which embodiments pertain, that technical problems to be solved by the embodiments are not limited to the above-described technical problems, and other technical problems will be more clearly understood from the following description.

Technical Solution

A triaxial rotation apparatus of an embodiment may include a driver, a first housing rotating about a first axis with respect to the driver while accommodating a first motor therein, a second housing rotating about a second axis perpendicular to the first axis with respect to the first housing while accommodating a second motor therein, a third housing rotating about a third axis perpendicular to the first axis and the second axis with respect to the second housing while accommodating a third motor therein, the third housing carrying a camera mounted thereto, a first connecting member disposed between the first motor and the first housing along a outer peripheral surface of the first motor, a second connecting member disposed between the second motor and the second housing along a outer peripheral surface of the second motor, and a third connecting member disposed between the third motor and the third housing along a outer peripheral surface of the third motor, wherein the first connecting member, the second connecting member, and the third connecting member may be made of a flexible material, and may be electrically connected to the driver.

The first connecting member may include a flexible printed circuit board, and may electrically connect the driver and the first motor. The second connecting member may include a flexible printed circuit board, and may electrically connect the first motor and the second motor. The third connecting member may include a flexible printed circuit board, and may electrically connect the second motor and the third motor.

In an embodiment, the triaxial rotation apparatus may further include a first frame rotating about the first axis in accordance with operation of the first motor, the first housing being fixed to the first frame, a second frame rotating about the second axis in accordance with operation of the second motor, the second housing being fixed to the second frame, and a third frame rotating about the third axis in accordance with operation of the third motor, the third housing being fixed to the third frame.

The first connecting member may include a first movable portion configured to be wound or unwound along and around the first motor in accordance with rotation of the first frame. The second connecting member may include a second movable portion configured to be wound or unwound along and around the second motor in accordance with rotation of the second frame. The third connecting member may include a third movable portion configured to be wound or unwound along and around the third motor in accordance with rotation of the third frame.

The first motor may be mounted to the driver such that the first motor rotates about the first axis with respect to the driver. The second motor may be mounted to the first frame such that the second motor rotates about the second axis with respect to the first frame. The third motor may be mounted to the second frame such that the third motor rotates about the third axis with respect to the second frame.

A second motor controller for controlling operation of the second motor may be mounted to the first frame at a position corresponding to the second motor in the direction of the second axis. A third motor controller for controlling operation of the third motor may be mounted to the second frame at a position corresponding to the third motor in the direction of the third axis.

The second motor controller may include a first connector coupled to the first connecting member, and a second connector coupled to the second connecting member. The second connector may be coupled to a portion of the second motor controller extending in the direction of the second axis in a bent state.

In an embodiment, the triaxial rotation apparatus may further include a first cover covering the second motor controller and a portion of the first connecting member.

The third motor controller may include a third connector coupled to the second connecting member, and a fourth connector coupled to the third connecting member. The fourth connector may be coupled to a portion of the third motor controller extending in the direction of the third axis in a bent state.

In an embodiment, the triaxial rotation apparatus may further include a second cover covering the third motor controller and a portion of the second connecting member.

Advantageous Effects

In each embodiment, the central portion of each connecting member is disposed in a state of being wound around the corresponding frame and, as such, the space of the triaxial rotation apparatus, in which the connecting member is disposed, may be considerably reduced. Accordingly, the triaxial rotation apparatus may be miniaturized.

In each embodiment, for the first to third frames, rotation speeds, rotation angles, rotation directions, etc. thereof are separately measured. Based on the measured values, the main controller may perform feedback control for rotation of the first to third frames. In accordance with such feedback control for rotation of the first to third frames, the triaxial rotation apparatus in the embodiment may precisely and effectively perform position control for the camera mounted thereon.

In each embodiment, the surface area of the stator is increased by virtue of the groove, and a heat dissipation area may be increased in accordance with the increased surface area. Accordingly, the motor including the rotor and the stator in the embodiment may effectively perform cooling. In addition, the recess may reduce the weight of the stator and, as such, there is an effect of lightening the triaxial rotation apparatus.

In each embodiment, the first to third frames, the first to third housings, and the first and second covers are made of aluminum exhibiting high heat transfer rate, and the outwardly-exposed surface area of the triaxial rotation apparatus is greatly increased by virtue of these elements. Accordingly, the first to third motors, the second motor controller, and the third motor may be effectively cooled.

In each embodiment, since the camera is provided to be detachably attached to the third frame, there is an effect of achieving easy repair or replacement of the camera.

BEST MODE

Figure 1:
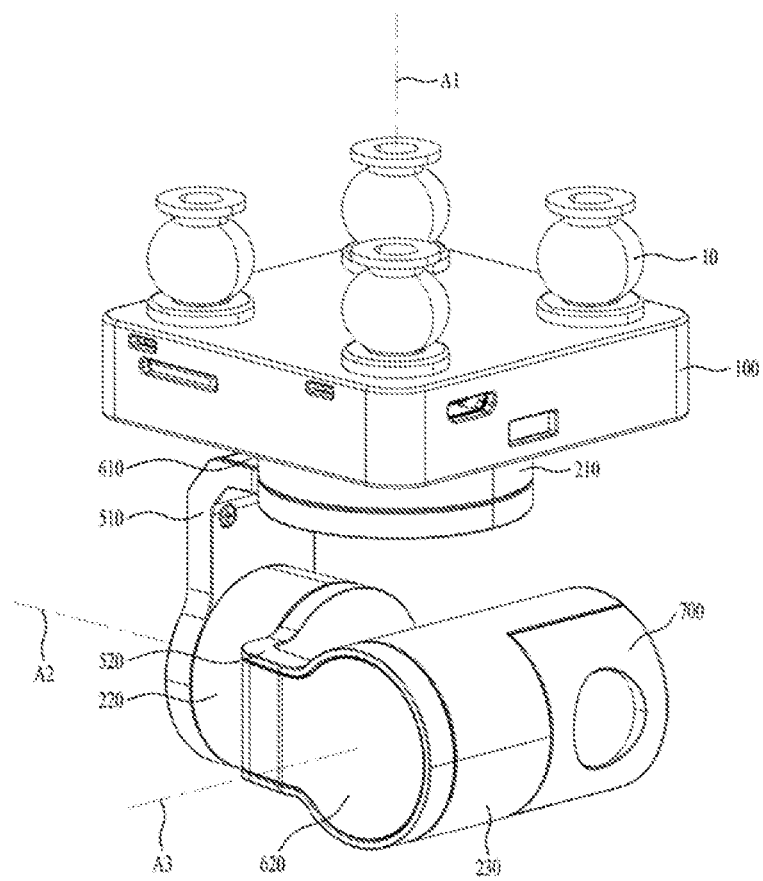
FIG. 1 is a perspective view illustrating a triaxial rotation apparatus of an embodiment.

Hereinafter, embodiments will be described in detail with reference to the accompanying drawings. Embodiments may be variously varied and may have various forms. In connection with this, specific embodiments will be illustrated in the drawings, and will be described in detail in the specification, but embodiments should not be construed as limited to the specific embodiments. It is to be appreciated that all changes, equivalents, and substitutes that do not depart from the spirit and technical scope of the embodiments are encompassed in the embodiments.

It will be understood that, although the terms "first", "second", etc. may be used herein to describe various elements, these elements should not be limited by these terms. These terms are only used to distinguish one element from another. In addition, terms specifically defined herein in consideration of the configurations and functions in embodiments are used only to disclose embodiments without limiting the scope of embodiments.

In the following description of embodiments, it will be understood that, when an element is referred to as being formed "on" or "under" another element, the two elements are in direct contact with each other, or are indirectly formed such that an intervening element is also present. Furthermore, when the expression "on" or "under" is used herein, it may involve not only the upward direction, but also the downward direction, with reference to one element.

In addition, it will be understood that relative terms used hereinafter such as "on"/"above"/"over" and "under"/"below"/"beneath" may be construed only to distinguish one element from another element without necessarily requiring or involving a certain physical or logical relation or sequence between the elements.

Figure 2:
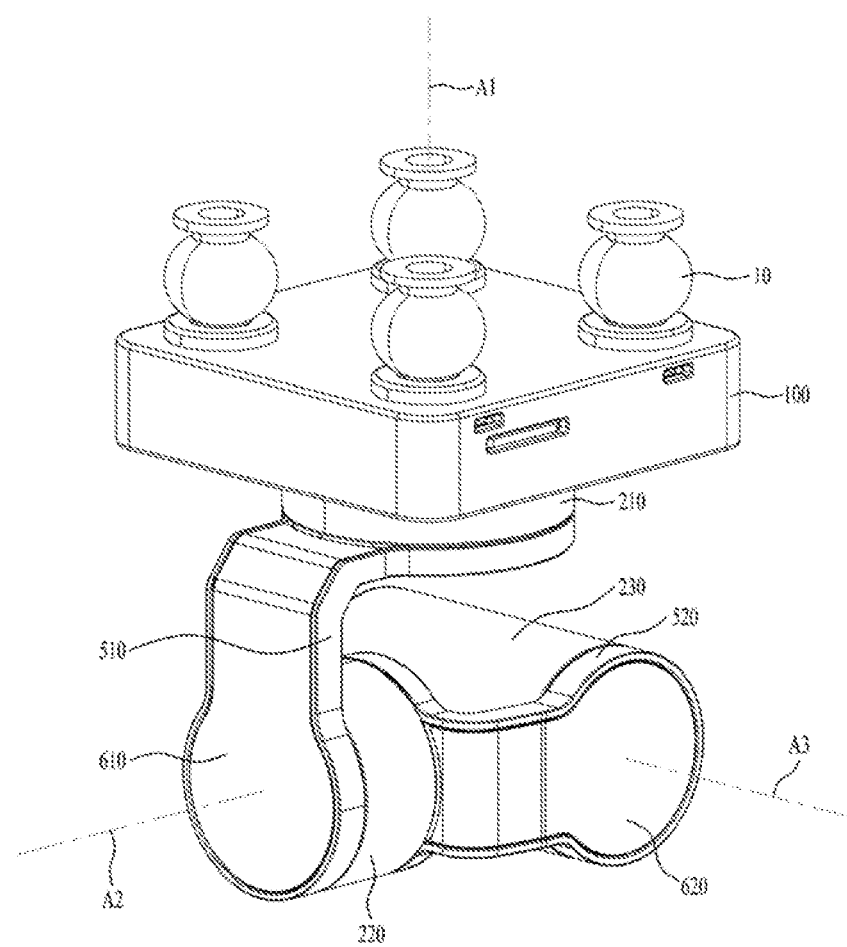
FIG. 2 is a view corresponding to FIG. 1 rotated about a first axis.
Figure 3:
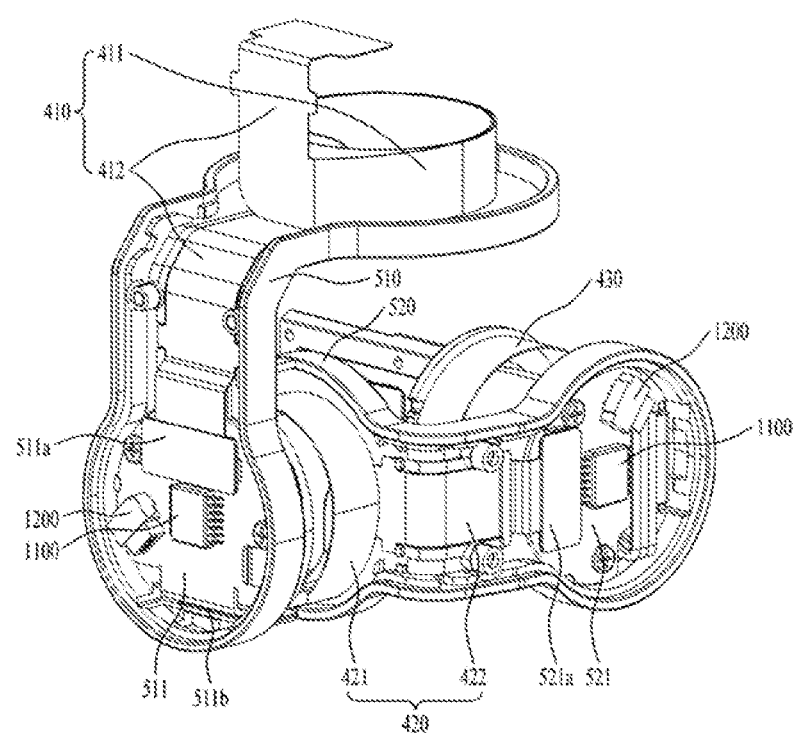
FIG. 3 is a view corresponding to FIG. 2 from which a part of configurations is omitted.
Figure 4:
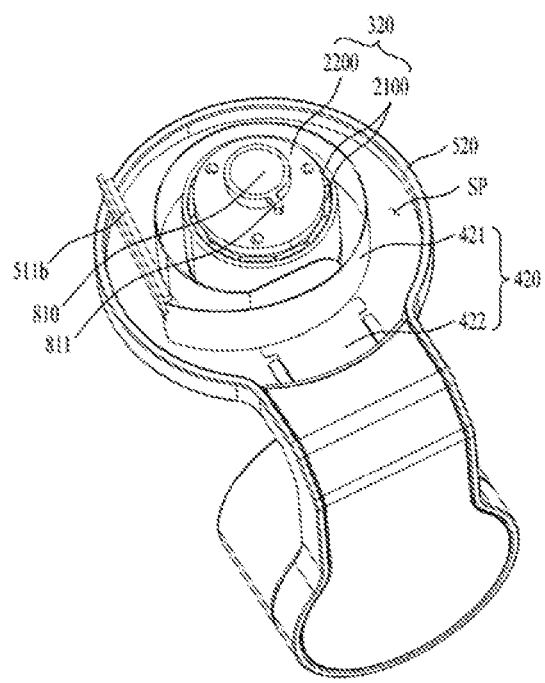
FIG. 4 is a view illustrating a portion of a second motor in an embodiment.
Figure 5:
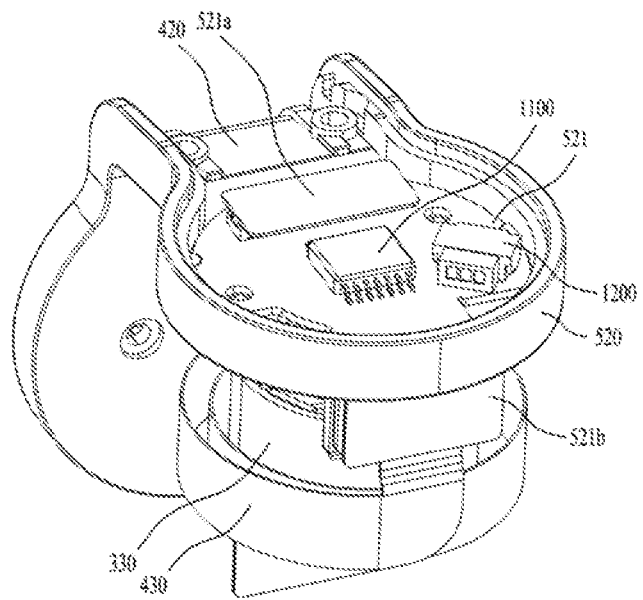
FIG. 5 is a view illustrating a portion of a third motor in an embodiment.
Figure 6:
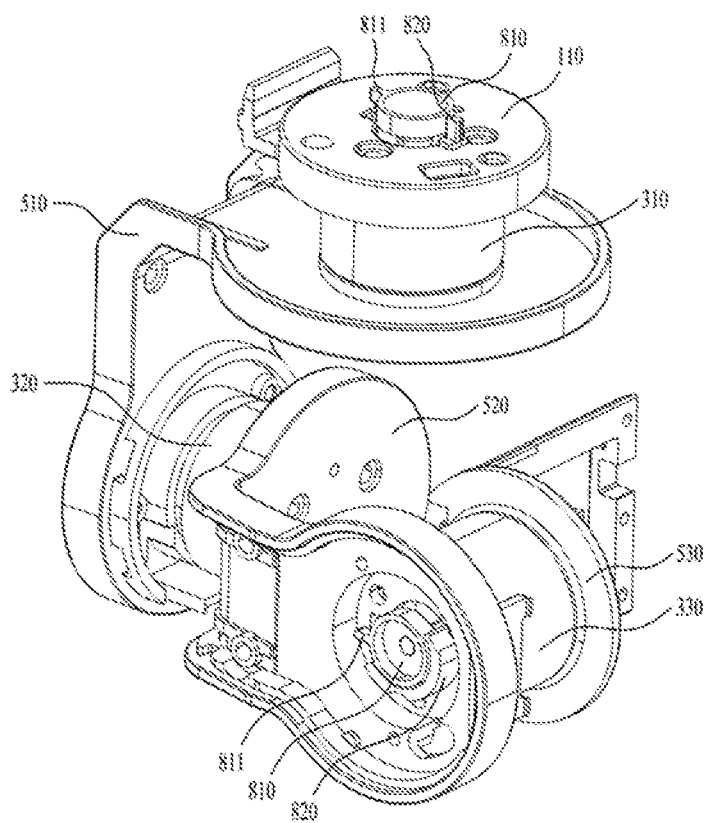
FIG. 6 is a view illustrating structures of first to third frames.
Figure 7:
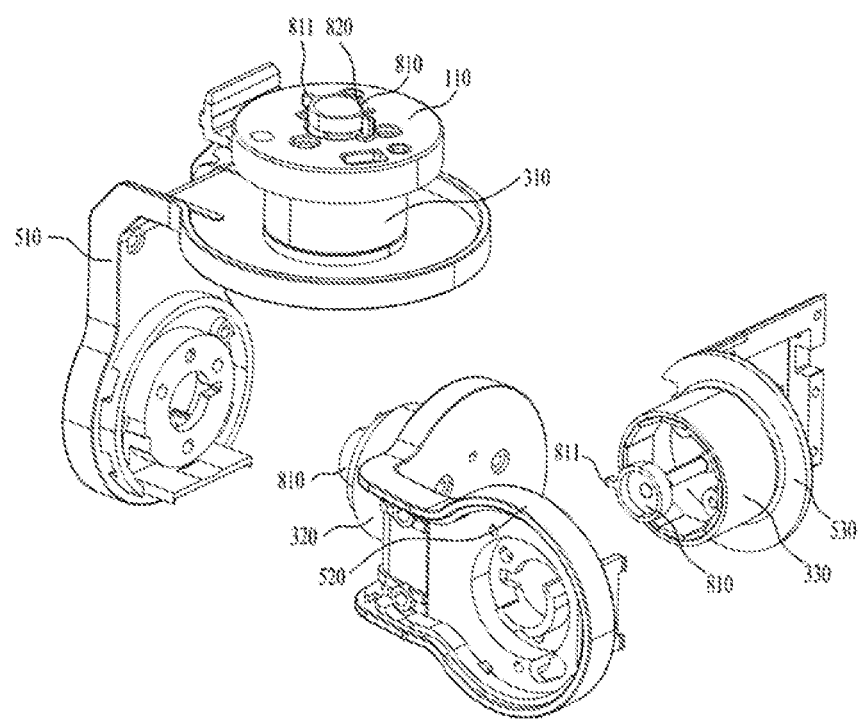
FIG. 7 is an exploded view corresponding to FIG. 6.

FIG. 1 is a perspective view illustrating a triaxial rotation apparatus of an embodiment. FIG. 2 is a view corresponding to FIG. 1 rotated about a first axis A1. FIG. 3 is a view corresponding to FIG. 2 from which a part of configurations is omitted. FIG. 4 is a view illustrating a portion of a second motor 320 in an embodiment. FIG. 5 is a view illustrating a portion of a third motor 330 in an embodiment. FIG. 6 is a view illustrating structures of first to third frames 510 to 530. FIG. 7 is an exploded view corresponding to FIG. 6.

A camera 700 is mounted on the triaxial rotation apparatus of the embodiment. The triaxial rotation apparatus itself may be mounted on an aerial vehicle such as a drone. In this case, the triaxial rotation apparatus enables the camera 700 to maintain an original posture thereof irrespective of triaxial rotation of the aerial vehicle.

The triaxial rotation apparatus may perform triaxial rotation. That is, the triaxial rotation apparatus may include a section rotating about a first axis A1, a section rotating about a second axis A2, and a section rotating about a third axis A3 perpendicular to the first axis A1 and the second axis A2.

In accordance with such a structure, the triaxial rotation apparatus may achieve three-dimensional rotation. When the aerial vehicle performs three-dimensional rotation, the triaxial rotation apparatus performs three-dimensional rotation compensating for such rotation of the aerial vehicle. Accordingly, the camera 700 mounted on the triaxial rotation apparatus may maintain an original posture thereof irrespective of three-dimensional rotation of the aerial vehicle.

As illustrated in FIGS. 6 and 7, the triaxial rotation apparatus may include a first frame 510, a second frame 520, a third frame 530, and a driver 100.

The first frame 510 has a bent shape throughout the entirety thereof. The first frame 510 may be mounted to the driver 100 at one side of a bent portion thereof. The second frame 520 may be mounted to the other side of the bent portion of the first frame 510 in the direction of the second axis A2. The first frame 510 may rotate about the first axis A1 with respect to the driver 100 in accordance with operation of a first motor 310.

The second frame 520 also has a bent shape throughout the entirety thereof. The second frame 520 may be mounted to the first frame 510 at one side of a bent portion thereof. The third frame 530 may be mounted to the other side of the bent portion of the second frame 520 in the direction of the third axis A3. The second frame 520 may rotate about the second axis A2 with respect to the first frame 510 in accordance with operation of a second motor 320.

The third frame 530 is mounted, at one side thereof, to the second frame 520. The camera 700 may be mounted to the third frame 530. The third frame 530 may rotate about the third axis A3 with respect to second frame 520 in accordance with operation of a third motor 330.

The driver 100 may be electrically connected to the first to third motors 310 to 330, may control operations of the first to third motors 310 to 330, and may supply current needed for operations of the first to third motors 310 to 330.

The driver 100 may control the first to third motors 310 to 330 as follows. First, the driver 100 may control the first to third motors 310 to 330 in order to maintain a posture of the camera 700.

That is, when the aerial vehicle performs three-dimensional rotation, the camera 700 mounted on the aerial vehicle generates yaws, such that the camera 700 rotates about the first axis A1 through a certain angle, rolls, such that the camera 700 rotates about the second axis A2 through a certain angle, and pitches, such that the camera 700 rotates about the third axis A3 through a certain angle.

The driver 100 may control rotation angles of the first to third motors 310 to 330 in order to compensate for such yaw, roll and pitch of the camera 700 and, as such, the camera 700 mounted to the aerial vehicle may maintain an original posture thereof even when the aerial vehicle performs three-dimensional rotation.

In addition, the driver 100 may positively control the first to third motors 310 to 330 to control a photographing direction of the camera 700. That is, the driver 100 may control the first to third motors 310 to 330 to rotate the first to third frames 530 by desired angles, respectively, thereby adjusting a photographing direction of the camera 700 mounted to the third frame 530.

Referring to FIGS. 1 and 2, the triaxial rotation apparatus may include a damper 10, first to third housings 210 to 230, a first cover 610, and a second cover 620.

The damper 10 is disposed in an area where the three-axis rotation apparatus is coupled to the aerial vehicle, in order to alleviate impact applied from the aerial vehicle to the three-axial rotation apparatus. The damper 10 may be provided in a required number at required positions in the coupling area of the three-axial rotation apparatus and the aerial vehicle.

The first housing 210 may rotate about the first axis A1 with respect to the driver 100. The first motor 310 may be disposed within the first housing 310.

The first housing 210 is fixed to the driver 100 and, as such, the first frame 510 may rotate about the first axis A1 in accordance with operation of the first motor 310. In addition, the first housing 210 and the first frame 510 may be formed to have an integrated structure and, as such, the first housing 210 may rotate about the first axis A1 together with the first frame 510.

The second housing 220 may rotate about the second axis A2 perpendicular to the first axis A1 with respect to the first housing 210. The second motor 320 may be disposed within the second housing 220.

The second housing 220 is fixed to the first frame 510 and, as such, the second frame 520 may rotate about the second axis A2 in accordance with operation of the second motor 320. In addition, the second housing 220 and the second frame 520 may be formed to have an integrated structure and, as such, the second housing 220 may rotate about the second axis A2 together with the second frame 520.

The third housing 230 may rotate about the third axis A3 perpendicular to the first axis A1 and the second axis A2 with respect to the second housing 220. The third motor 330 is disposed within the third housing 230. The camera 700 may be mounted to the third frame 530.

The third housing 230 is coupled to the second frame 520 and, as such, the third frame 530 may rotate about the third axis A3 in accordance with operation of the third motor 330. In addition, the third housing 230 and the third frame 530 may be formed to have an integrated structure and, as such, the third housing 230 may rotate about the third axis A3 together with the third frame 530.

The camera 700 is mounted to the third frame 530 and, as such, may also rotate about the first to third axes A1 to A3 as the third frame 530 rotates about the first to third axes A1 to A3.

The first cover 610 may be coupled to the first frame 510 to cover a second motor controller 511 and a portion of a first connecting member 410. That is, when the first cover 610 is coupled to the first frame 510, a space may be formed between the first cover 610 and the first frame 510. In this space, the second motor controller 511 and a portion of the first connecting member 410 may be accommodated. The first cover 610 may cover and protect the second motor controller 511 and the portion of the first connecting member 410.

The second cover 620 may be coupled to the second frame 520 to cover the third motor 330 and a portion of a second connecting member 420. Similarly to the first cover 610, when the second cover 620 is coupled to the second frame 520, a space may be formed between the second cover 620 and the second frame 520. In this space, the third motor 330 and a portion of the second connecting member 420 may be accommodated. The second cover 620 may cover and protect the third motor 330 and the portion of the second connecting member 420.

Hereinafter, connecting members will be concretely described with reference to FIGS. 3 and 4. The connecting members may be electrically connected to the driver 100, and may include first to third connecting members 410 to 430.

The first connecting member 410 may be disposed between the first motor 310 and the first housing 210 along an outer peripheral surface of the first motor 310. The second connecting member 420 may be disposed between the second motor 320 and the second housing 220 along an outer peripheral surface of the second motor 320. The third connecting member 430 may be disposed between the third motor 330 and the third housing 230 along an outer peripheral surface of the third motor 330.

The first connecting member 410, the second connecting member 420, and the third connecting member 430 may be made of a flexible material, and may be electrically connected to the driver 100. That is, the first connecting member 410, the second connecting member 420, and the third connecting member 430 may be sequentially electrically connected to one another. The first connecting member 410 may be electrically connected to the driver 100.

For example, the first connecting member 410 may electrically connect the driver 100 and the first motor 310. The second connecting member 420 may electrically connect the first motor 310 and the second motor 320. The third connecting member 430 may electrically connect the second motor 320 and the third motor 330.

A central portion of each connecting member has a shape surrounding the corresponding motor, and may be disposed within the corresponding housing. Each connecting member may be electrically connected, at opposite ends thereof, to the driver 100, the corresponding motor controller, or the camera 700. A portion of each connecting member connected to the corresponding motor controller may be partially accommodated in the corresponding housing, and the remaining portion of the connecting member may be accommodated in the corresponding cover.

In detail, the first connecting member 410 is electrically connected, at one end thereof, to the driver 100 while being electrically connected, at the other end thereof, to the second motor controller 511. In this case, a portion of the first connecting member 410 connected to the second motor controller 511 may be accommodated in the first cover 610.

The second connecting member 420 is electrically connected, at one end thereof, to the second motor controller 511 while being electrically connected, at the other end thereof, to the third motor 330. In this case, a portion of the second connecting member 420 connected to the second motor controller 511 may be accommodated in the second housing 220. A portion of the second connecting member 420 connected to the third motor 330 may be accommodated in the second cover 620.

The third connecting member 430 is electrically connected, at one end thereof, to the third motor 330 while being electrically connected, at the other end thereof, to the camera 700. In this case, both a portion of the third connecting member 430 connected to the third motor 330 and a portion of the third connecting member 430 connected to the camera 700 may be accommodated in the third housing 230.

Spaces may be formed between corresponding ones of the housings and the motors, respectively. Each space may be formed between an inner surface of the corresponding housing and the outer peripheral surface of the corresponding housing. In the space, the corresponding connecting member may be disposed.

The connecting members may include, for example, the first connecting member 410, which is disposed in a space between the first housing 210 and the first motor 310, the second connecting member 420, which is disposed in a space between the second housing 220 and the second motor 320, and the third connecting member 430, which is disposed in a space between the third housing 230 and the third motor 330.

That is, spaces are formed between the first housing 2310 and the first motor 310, between the second housing 220 and the second motor 320 and between the third housing 230 and the third motor 330, respectively. In these spaces, central portions of the first connecting member 410, the second connecting member 420, and the third connecting member 430 may be accommodated, respectively.

Each connecting member may be disposed along the outer peripheral surface of the corresponding motor in a wound state, and may be made of a flexible material such that the connecting member is deformable in circumferential and diametric directions of the motor.

Hereinafter, a wound form of the first connecting member 410 among the connecting members will be described in detail with reference to FIG. 4. Wound forms of the second connecting member 420 and the third connecting member 430 are similar to that of the first connecting member 420 and, as such, no overlapping description thereof will be given.

The second motor 320 may include a rotor 2100 and a stator 2200. In this case, the stator 2200 is disposed inside, and the rotor 2100 is disposed outside the stator 2200. Accordingly, the second connecting member 420 may be disposed in a space SP between an outer peripheral surface of the rotor 2100 and an inner surface of the second housing 220 in a state of being wound in a circumferential direction of the rotor 2100.

Although the second housing 220 is not shown in FIG. 4, the second housing 220 is disposed to surround the second connecting member 420 while having a shape corresponding to an arc-shaped protrusion portion of the second frame 520.

The first connecting member 410 may include a plurality of circuits or wires for electrical connection, and may be configured to be easily deformable. For example, the first connecting member 410 may be formed by a flexible printed circuit board (FPCB).

The first connecting member 410 may include a first movable portion, which can be wound or unwound along and around the first motor 310, and first fixed portions, which are fixed to the first frame.

The first movable portion of the first connecting member 410 may be formed to have a greater length than an outer periphery of the first motor 310, and may be disposed to surround a portion of the first motor 310.

The first connecting member 410 is connected, at one side thereof, to the corresponding motor controller while being fixed, at the other side thereof, to the first frame.

The first connecting member 410 may further include an extension portion extending to the second motor controller 511 while being fixed to the first frame.

Similarly, each of the second connecting member 420 and the third connecting member 430 may include a plurality of circuits or wires for electrical connection, and may be configured to be easily deformable. As such, for example, each of the second connecting member 420 and the third connecting member 430 may include a flexible printed circuit board.

Since the first connecting member 410 is fixedly coupled, at opposite ends thereof, to the first frame 510 and the second frame 520, respectively, the angle between the opposite ends of the first connecting member 410 may be decreased or increased as the second frame 520 rotates in the direction of the second axis A2 with respect to the first frame 510.

When the angle between the opposite ends of the first connecting member 410 increases, the wound central portion of the first connecting member 410 is tightened and, as such, may be deformed in circumferential and diametric directions of the corresponding motor such that the diameter thereof decreases.

On the contrary, when the angle between the opposite ends of the first connecting member 410 decreases, the wound central portion of the first connector 410 is loosened and, as such, may be deformed in the circumferential and diametric directions of the corresponding motor such that the diameter thereof increases.

The central portion of each connecting member is disposed in the space formed in the corresponding frame. Accordingly, even when the first to third frames 510 to 530 of the triaxial rotation apparatus rotate about the first to third axes A1 to A3, respectively, the connecting members may electrically connect the driver 100 and corresponding ones of the motors while being deformed in accordance with rotation of the first to third frames 510 to 530, respectively.

The central portion of each connecting member may be provided as a movable portion configured to be wound or unwound with respect to the corresponding motor. Opposite ends of the connecting member extending from the movable portion may be provided as fixed portions rotating in a state of being fixed to the corresponding frame.

In this case, the movable portion may be deformed as the corresponding one of the first to third frames 510 to 530 of the triaxial rotation apparatus rotates about the corresponding one of the first to third axes A1 to A3 and, as such, may be wound or unwound with respect to the corresponding motor.

For example, the first connecting member 410 may include a first movable portion 411 wound or unwound with respect to the first motor 310 as the first frame 510 rotates, and first fixed portions 412 rotating in a state of being fixed to the first frame 510.

In addition, the second connecting member 420 may include a second movable portion 421 wound or unwound with respect to the second motor 320 as the second frame 520 rotates, and second fixed portions 422 rotating in a state of being fixed to the second frame 520.

Figure 9:
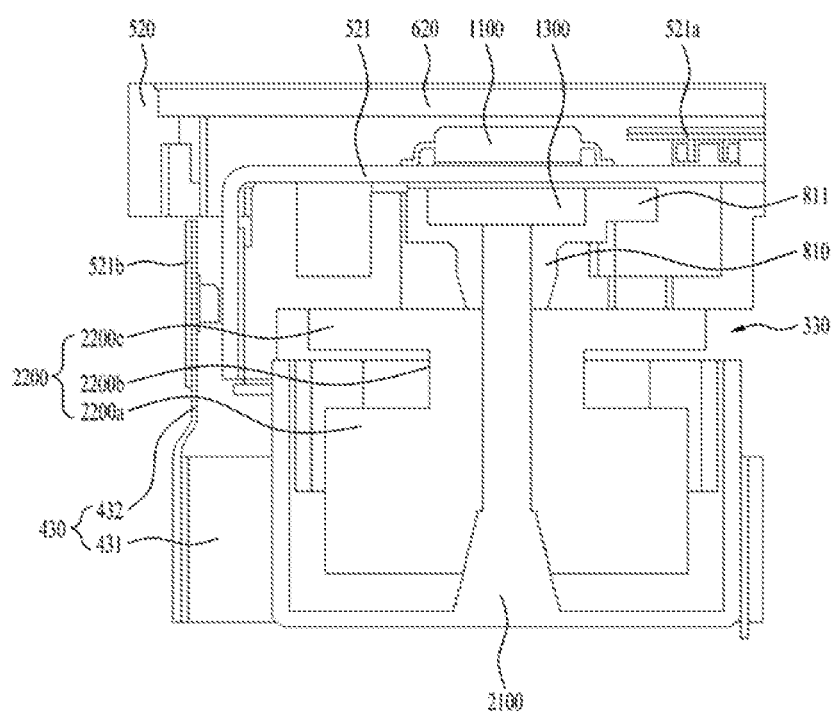
FIG. 9 is a sectional view illustrating a portion of the third motor in an embodiment.

In addition, referring to FIG. 9, the third connecting member 430 may include a third movable portion 431 wound or unwound with respect to the third motor 330 as the third frame 530 rotates, and third fixed portions 432 rotating in a state of being fixed to the third frame 530.

In the embodiment, since the movable portion of each connecting member is disposed in a state of being wound around the corresponding frame, as in the above-described structure, it may be possible to considerably reduce the space of the triaxial rotation apparatus in which the connecting member is disposed and, as such, the triaxial rotation apparatus may be miniaturized.

In the embodiment, all elements of the triaxial rotation apparatus are electrically connected by the first to third connecting members 410 to 430 and, as such, separate connecting lines for electrically connecting the elements, for example, a connecting line for transmission of camera image data, a power connecting line for supply of current, etc., are unnecessary. Accordingly, the triaxial rotation apparatus of the embodiment has a compact electrical connection structure and, as such, there are effects of miniaturizing the apparatus and enhancing durability of the apparatus.

In the embodiment, the connecting members are accommodated in the spaces formed by the first to third housings 210 to 230 and the first to third frames 510 and 530, and may be prevented from being externally exposed by respective housings, respective frames, and the first cover 610 and the second cover 620.

In accordance with such a structure, contact of each connecting member with moisture or other foreign matter caused by external exposure may be minimized and, as such, durability of the triaxial rotation apparatus in the embodiment may be enhanced.

Meanwhile, the triaxial rotation apparatus may include motors, and the motors may include the first motor 310, the second motor 320, and the third motor 330.

The first motor may be mounted to the driver 100 to rotate about the first axis A1 with respect to the driver 100. As the first motor 310 rotates, the first frame 510 coupled to the first motor 310 may rotate about the first axis A1.

Referring to FIGS. 6 and 7, the driver 100 may include a mounting member 110 in order to enable the first motor 310 to rotate with respect to the driver 100. The first motor 310 may be coupled to the mounting member 110 such that the first motor 310 is rotatable with respect to the mounting member 110. The mounting member 110 may be fixedly coupled to the driver 100.

Meanwhile, a first motor controller (not shown) may be provided at the driver 100. The first motor controller may control the first motor 310 to rotate about the first axis A1.

The second motor 320 may be mounted to the first frame 510 such that the second motor 320 is rotatable about the second axis A2 with respect to the first frame 510. As the second motor 320 rotates, the second frame 520 coupled to the second motor 320 may rotate about the second axis A2.

The third motor 330 may be mounted to the second frame 520 such that the third motor 330 is rotatable about the third axis A3 with respect to the second frame 520. As the third motor 330 rotates, the third frame 530 coupled to the third motor 330 may rotate about the third axis A3.

The second motor controller 511 is mounted to the first frame 510 to control operation of the second motor 320. That is, the second motor controller 511, which controls operation of the second motor 320, may be mounted to the first frame 510 at a position corresponding to the second motor 320 in the direction of the second axis A2.

The third motor 330 is mounted to the second frame 520 to control operation of the second motor 320. That is, the third motor 330, which controls operation of the second motor 320, may be mounted to the second frame 520 at a position corresponding to the second motor 320 in the direction of the third axis A3.

Referring to FIG. 3, the second motor controller 511 may include a first connector 511a coupled to the first connecting member 410, and a second connector 511b coupled to the second connecting member 420. In this case, the second connector 511b may be coupled to a portion of the second motor controller 511 extending in the direction of the second axis A2 in a bent state.

In addition, the third motor controller 521 may include a third connector 521a coupled to the second connecting member 4210, and a fourth connector 521b coupled to the third connecting member 430. In this case, the fourth connector 521b may be coupled to a portion of the third motor 330 extending in the direction of the third axis A3 in a bent state.

Hereinafter, the third motor 330 will be described in detail with reference to FIG. 5. Since the second motor controller 511 is very similar to the third motor 330 in terms of structure, no overlapping description thereof will be given.

As illustrated in FIG. 5, the third motor 330 may be provided in the form of a circuit board including various elements and circuits for controlling a rotation angle, a rotation direction, a rotation speed, etc. of the third motor 330.

As an element for controlling the third motor 330, for example, a motor control sensor 1100 may be provided at the third motor 330. The motor control sensor 1100 will be concretely described later.

The motor control sensor 1100 may be disposed at one surface of the third motor 330 while facing a sensing magnet 1300 provided at the motor 330 and facing the motor 330 in the direction of the third axis A3.

In addition, since the third motor 330 is provided in the form of a circuit board, the third motor 330 may be accommodated in a space formed by the second frame 520 and the second cover 620 and, as such, the space accommodating the third motor 330 may be reduced. Accordingly, the triaxial rotation apparatus may be minimized. Furthermore, the second cover 620 covers the third motor 330 to prevent external exposure of the third motor 330. As such, the second cover 620 may protect the third motor 330.

Meanwhile, a cable connecting member 1200 may be provided at the third motor 330. The cable connecting member 1200 and the third motor 330 may be electrically connected by a cable. In this regard, the cable connecting member 1200 is a device for connecting the cable to the third motor 330.

The third connector 521a is coupled to one side of the second connecting member 420 and, as such, serves to electrically connect the second connecting member 420 and the third motor 330. The fourth connector 521b is coupled to one side of the third connecting member 430 and, as such, serves to electrically connect the third connecting member 430 and the third motor 3309.

The third connector 521a and the fourth connector 521b may be coupled to the third motor 330 in a socket manner. After coupling, the third connector 521a and the fourth connector 521b may be fixed to the third motor 330 using an adhesive.

The third connector 521a and the fourth connector 521b may achieve easy coupling between the third motor 330 and the connecting members and easy assembly of elements. That is, the third motor 330 and the connecting members are separately manufactured without being formed to have an integrated structure. Through coupling of the third motor 330 and the connecting members, assembly of the triaxial rotation apparatus is achieved. Accordingly, easy assembly of the triaxial rotation apparatus may be achieved.

Meanwhile, the fourth connector 521b may be coupled to a portion of the third motor 330 extending from the third motor 330 in the direction of the third axis A3 in a bent state. Accordingly, the fourth connector 521b may be disposed in a space where the wound central portion of the third connecting member 430 is disposed. In this regard, the fourth connector 521b may be disposed in a space different from the space which is formed by the second frame 520 and the second cover 620 and in which the third motor 330 is disposed.

In order to electrically connect the third motor 330 and the fourth connector 521b, a through hole may be formed at a portion of the second frame 520 corresponding to an area where the fourth connector 521b is disposed.

In accordance with this structure, the area of the third motor 330, which is provided in the form of a circuit board, may be increased. Accordingly, increased numbers of elements and circuits may be formed at the third motor 330.

Figure 8:
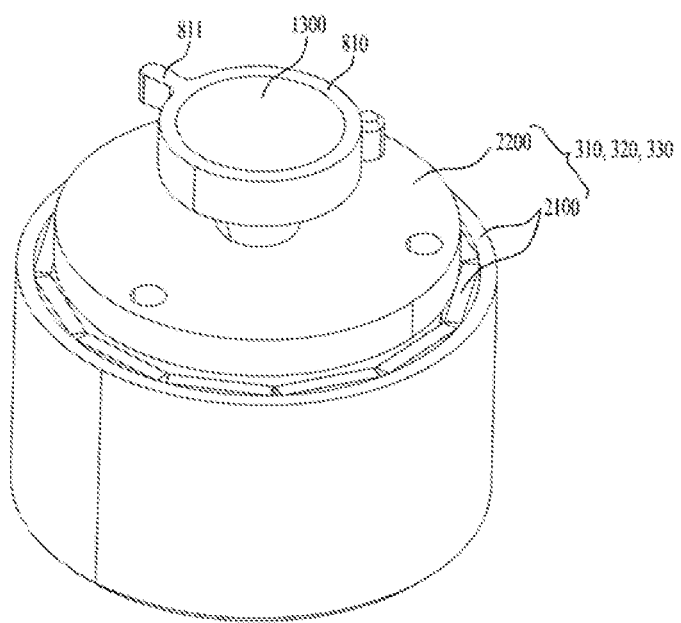
FIG. 8 is a view illustrating a first motor, the second motor or a third motor in an embodiment.

FIG. 8 is a view illustrating the first motor 310, the second motor 320 or the third motor 330 in an embodiment. Each motor may include a rotor 2100 as a rotating part and a stator 2200 as a fixed part. The stator 2200 is disposed inside the motor. The rotor 2100 is disposed to surround the stator 2200.

To the rotor 2100, the corresponding frame and the corresponding housing may be fixedly coupled. Accordingly, in accordance with rotation of the rotor 2100, the frame and the housing may rotate about a corresponding one of the first to third axes A1 to A3.

FIG. 9 is a sectional view illustrating a portion of the third motor 330 in an embodiment. Referring to FIGS. 6 to 9, a first stopper 810 may be provided at the rotor 2100.

As illustrated in FIG. 9, the first stopper 810 may be disposed on an upper portion of the stator 2200. The rotor 2100 is provided, at a central portion thereof, with a pole protruding in the direction of the third axis A3. The first stopper 810 may be fixedly coupled to the pole.

Accordingly, the first stopper 810—may rotate in the direction of the third axis A3 in accordance with rotation of the rotor 2100. In an embodiment, as illustrated in FIGS. 6 and 7, the first stopper 810 may be provided in a total of three such that the three first stoppers 810 are coupled to the first to third motors 310 to 330, respectively.

The first stoppers 810, which are three in total, may rotate about the first to third axes A1 to A3, respectively, as the rotors 2100 of the first to third motors 310 to 330 rotate. The first stoppers 810 may function to limit rotation angles of the first to third frames 510 to 530, respectively.

For stable operation of the triaxial rotation apparatus, rotation angles of the first to third frames 510 to 5309 may be limited. In an embodiment, maximum rotation angles of the first to third frames 510 to 530 may be 170 to 175°.

Thus, the first stoppers 810 may limit rotation angles of the frames, respectively. Each first stopper 810 includes a first protrusion 811 formed to protrude in a diametric direction. The first protrusion 811 may limit the rotation angle of the corresponding frame together with a second stopper 820 formed corresponding to the first protrusion 811.

Referring to FIGS. 6 and 7, the second stopper 820 corresponding to the first stopper 810 provided at the first motor 310 may be provided at the mounting member 110. That is, a pair of second stoppers 820 may be provided at portions of the mounting member 110 corresponding to the first protrusion 811 in a circumferential direction of the first stopper 810. The angle between the pair of second stoppers 820 may be equal to a maximum rotation angle of the first frame 510.

Meanwhile, the second stoppers 820 corresponding to the first stoppers 810 provided at the second motor 320 and the third motor 330 may be provided at the first frame 510 and the second frame 520, respectively.

Figure 10:
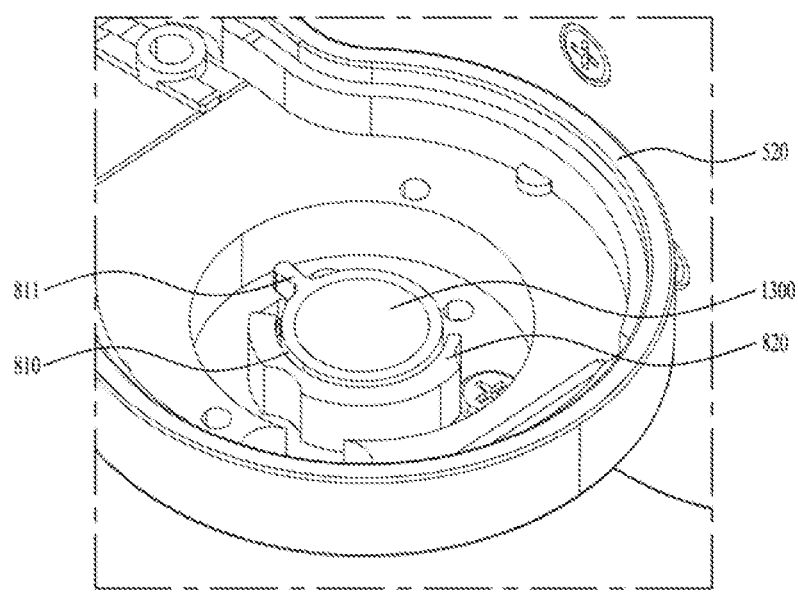
FIGS. 10 and 11 are views explaining operations of first stoppers and second stoppers in an embodiment.
Figure 11:
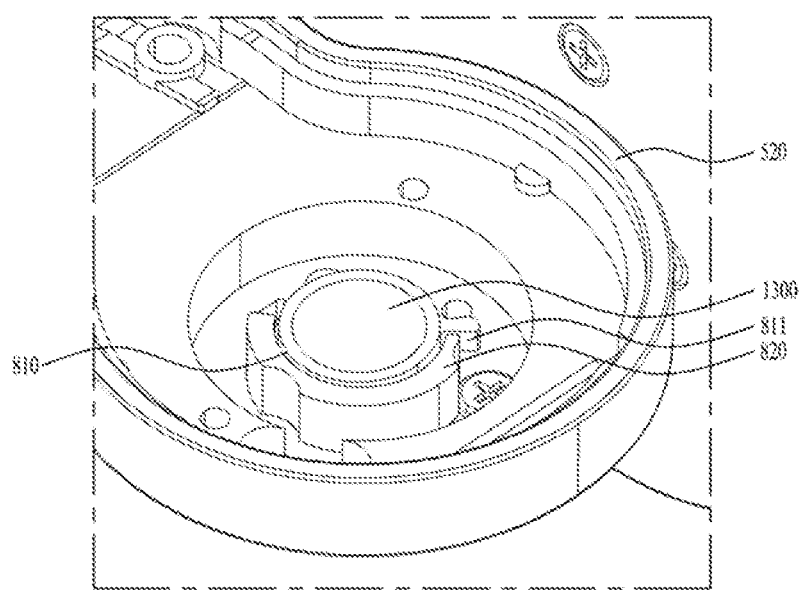
Figure 12:
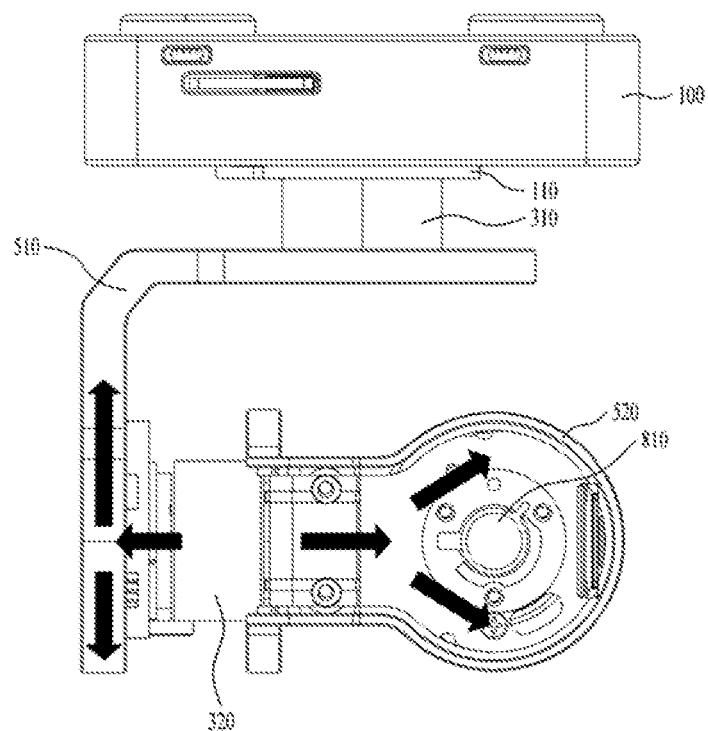
FIG. 12 is a view explaining a heat transfer structure of the triaxial rotation apparatus in an embodiment.

FIGS. 10 and 11 are views explaining operations of the first stoppers 810 and the second stoppers 820 in an embodiment. Although FIGS. 11 and 12 show the first stopper 810 provided at the third motor 330, the first stopper 810 provided at the second motor 320 has a structure similar to that of the first stopper 810 provided at the third motor 330 and, as such, no overlapping description will be given.

The first stopper 810 is inserted into a mounting hole formed at the second frame 520. The second frame 520 may be formed with the second stopper 820 which is formed with steps at portions thereof corresponding to the first protrusion 811 in a circumferential direction of the first stopper 810, respectively.

The steps of the second stopper 820 may be formed at opposite circumferential ends of the second stopper 820, respectively. The angle between the opposite steps may be equal to a maximum rotation angle of the third frame 530. Accordingly, in accordance with rotation of the rotor 2100, the first stopper 810 rotates. When the first protrusion 811 comes into contact with any step of the second stopper 820, the first stopper 810 can no longer rotate.

As rotation of the second stopper 820 is limited, rotation of the third frame 530, to which the second stopper 820 is fixedly mounted, may be limited within the angle between the opposite steps of the second stopper 820.

FIG. 9 is a sectional view illustrating a portion of the third motor 330 in an embodiment. The triaxial rotation apparatus in the embodiment may include a position sensing means for the third frame 530, which senses a rotation speed, a rotation angle, a rotation direction, etc. of the rotor 2100 of the third motor 330, thereby sensing a rotation speed, a rotation angle, a rotation direction, etc. of the third frame 530.

The position sensing means may include a motor control sensor 1100 and a sensing magnet 1300. The sensing magnet 1300 may be mounted on an upper portion of the first stopper 810, and the motor control sensor 1100 may be mounted on an upper surface of the third motor 330.

In this case, the sensing magnet 1300 and the motor control sensor 1100 may be disposed to face in the direction of the third axis A3. Accordingly, although the third motor 330, which has the form of a circuit board, is disposed between the sensing magnet 1300 and the motor control sensor 1100 in the direction of the third axis A3, the motor control sensor 1100 may sufficiently sense a variation in magnetic force of the sensing magnet 1300.

Meanwhile, the sensing magnet 1300 may be provided as a permanent magnet, and the motor control sensor 1100 may be provided as, for example, a Hall sensor. Of course, embodiments are not limited to such conditions.

The motor control sensor 1100 is fixedly mounted to the third motor 330 and, as such, does not rotate with respect to the sensing magnet 1300. The sensing magnet 1300 may be fixedly mounted to the first stopper 810, and the first stopper 810 may be fixedly mounted to the rotor 2100.

That is, as illustrated in FIG. 9, a mounting rod may be centrally provided at the rotor 2100. The first stopper 810 may be fixedly coupled to the mounting rod. Accordingly, the first stopper 810 and the sensing magnet 1300 may be fixed to the rotor 2100.

Thus, when the rotor 2100 rotates about the third axis A3, the first stopper 810 and the sensing magnet 1300 may be simultaneously rotated about the third axis A3. In addition, when the rotor 2100 rotates, the third frame 530, the first stopper 810, and the sensing magnet 1300, which are fixedly coupled to the rotor 2100, may be simultaneously rotated about the third axis A3.

When the sensing magnet 1300 rotates in accordance with rotation of the rotor 2100, the motor control sensor 1100 may sense variation in a magnetic field of the sensing magnet 1300, which rotates, and, as such, may sense a rotation speed, a rotation angle, a rotation direction, etc. of the third frame 530.

Information sensed by the motor control sensor 110 for rotation of the third frame 530 is sent to a main controller provided at the driver 100. The main controller may perform feedback control for rotation of the third frame 530 based on the received information.

As the main controller performs feedback control for the third frame 530, the triaxial rotation apparatus in the embodiment may precisely and effectively perform position control for the camera 700 mounted thereon.

Meanwhile, the triaxial rotation apparatus in the embodiment may include a position sensing means for sensing a rotation speed, a rotation angle, a rotation direction, etc. of the second frame 520. The position sensing means for the second frame 520 has a structure very similar to the above-described structure of the position sensing means for the third frame 530 and, as such, no overlapping description will be given.

In addition, the triaxial rotation apparatus in the embodiment may include a position sensing means for sensing a rotation speed, a rotation angle, a rotation direction, etc. of the first frame 510. The position sensing means for the first frame 510 has a structure very similar to the above-described structure of the position sensing means for the second frame 520, except that the motor control sensor 1100 is mounted to the circuit board provided at the driver 100, and, as such, no overlapping description will be given.

As described above, in the embodiment, for the first to third frames 510 to 530, rotation speeds, rotation angles, rotation directions, etc. thereof are separately measured. Based on the measured values, the main controller may perform feedback control for rotation of the first to third frames 510 to 530.

In accordance with such feedback control for rotation of the first to third frames 510 to 530, the triaxial rotation apparatus in the embodiment may precisely and effectively perform position control for the camera 700 mounted thereon.

In an embodiment, the sensing magnet 1300 may have an integrated structure with the corresponding stopper, and the motor control sensor 1100 may have an integrated structure with the corresponding motor controller. Since the stopper and the motor controller are spaced apart from each other by a uniform distance, the sensing magnet 1300 and the motor control sensor 1100 may also be spaced apart from each other by a uniform distance.

In order to enable the motor control sensor 1100 to achieve precise sensing, the distance between the sensing magnet 1300 and the motor control sensor 1100 should be kept uniform. In the embodiment, by virtue of the above-described structure, the distance between the sensing magnet 1300 and the motor control sensor 1100 may be kept uniform, without addition of separate elements for maintenance of the distance.

Accordingly, there is no assembly tolerance caused by addition of separate elements and, as such, it may be possible to effectively suppress a variation in the distance between the sensing magnet 1300 and the motor control sensor 1100 occurring in accordance with rotation of the sensing magnet 1300 with respect to the motor control sensor 1100 due to the above-described assembly tolerance.

Referring to FIG. 9, the stator 2200 may be mounted inside the rotor 2100. A hole, into which the mounting rod of the rotor 2100 is inserted, may be centrally formed at the stator 2200 in the direction of the third axis A3. In addition, the stator 2200 may include a first body 2200*a*, a groove 2200*b*, and a second body 2200*c*.

The first body 2200*a* may form a lower portion of the stator 2200, and the second body 2200*c* may form an upper portion of the stator 2200. In this case, the first body 2200*a* and the second body 2200*c* may be formed to have an integrated structure.

The groove 2200*b* may be formed as a side surface of the stator 2200 between the first body 2200*a* and the second body 2200*c* is recessed in a diametric direction of the stator 220 while extending in a circumferential direction of the stator 2200. As the groove 2200*b* is formed, the surface area of the stator 2200 may increase.

As the surface area of the stator 2200 increases by virtue of the groove 2200*b*, and a heat dissipating area is increased in accordance with the increased surface area, the motor including the rotor 2100 and the stator 2200 in the embodiment may achieve efficient cooling.

In addition, the groove 2200b reduces the weight of the stator 2200 and, as such, there is an effect of lightening the triaxial rotation apparatus.

The groove 2200b may be provided in plural. In this case, the grooves 2200b may be disposed to be aligned in the direction of the third axis A3. The number of the grooves 2200b may be appropriately selected, taking into consideration cooling efficiency, lightness requirement, output, rigidity, etc. of the third motor 330.

Similarly, the stators 2200 provided at the first motor 310 and the second motor 320 may have a groove having a structure identical or similar to that of the groove 2200b provided at the third motor 330.

FIG. 12 is a view explaining a heat transfer structure of the triaxial rotation apparatus in an embodiment. In the embodiment, it is necessary to effectively dissipate heat generated due to operations of the first to third motors 310 to 330 and heat generated from the second motor controller 511 and the third motor 330.

To this end, in the embodiment, the first to third frames 510 to 530, the first to third housings 210 to 230, and the first and second covers 610 and 620 may be made of a material exhibiting high heat transfer rate and excellent corrosion resistance, for example, aluminum.

In addition, the first to third motors 310 to 330, the second motor controller 511, and the third motor 330, which are elements generating heat, may be disposed to directly contact the first to third frames 510 to 530.

In accordance with such a structure, referring to FIG. 12, for example, heat generated from the second motor 320 and the second motor controller 511 disposed adjacent to the second motor 320 is conducted to the first frame 510 and the second frame 5200 directly contacting the second motor 320 and the second motor controller 511, as indicated by arrows, and, as such, effective heat transfer may occur.

Heat transferred to the first frame 510 and the second frame 520 may be dissipated outwards of the triaxial rotation apparatus via the first and second frames 510 and 520, and the first and second covers 610 and 620 respectively coupled to the first and second frames 510 and 520.

In addition, similarly, in the third motor 330 having a similar structure to the second motor 320, heat generated from the third motor 330 may be effectively dissipated outwards of the triaxial rotation apparatus via the second frame 520, the third frame 530, and the second cover 620.

Meanwhile, although not shown in FIG. 12, the first to third housings 210 to 230 are disposed to directly contact the first to third frames 510 to 530, heat may also be dissipated outwards of the triaxial rotation apparatus via the first to third housings 210 to 230.

In an embodiment, the first to third frames 510 to 530, the first to third housings 210 to 230, and the first and second covers 610 and 620 are made of aluminum exhibiting high heat transfer rate, and the outwardly-exposed surface area of the triaxial rotation apparatus is greatly increased by virtue of these elements. Accordingly, the first to third motors 310 to 330, the second motor controller 511, and the third motor controller 521 may be effectively cooled.

Figure 13:
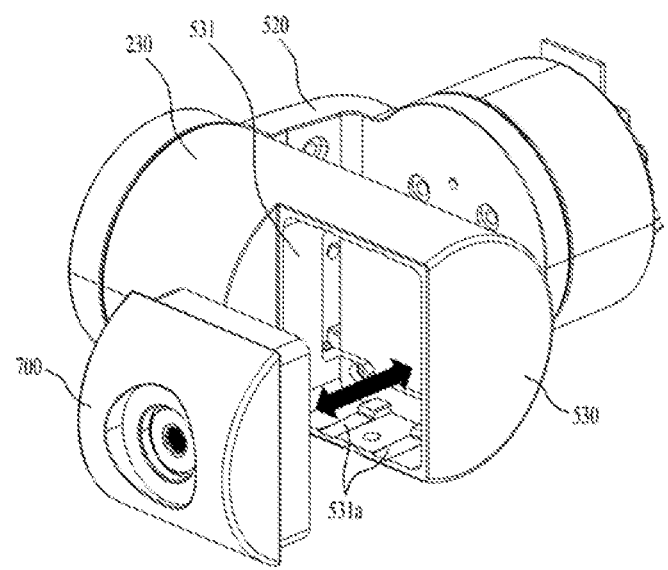
FIG. 13 is a view explaining structures of the third frame and a camera in an embodiment.

FIG. 13 is a view explaining structures of the third frame 530 and the camera 700 in an embodiment. As illustrated in FIG. 13, the camera 700 may be provided to be detachably attached to the third frame 530.

For mounting of the camera 700, a mounting groove 531 is formed at the third frame 530, and a portion of the camera 700 may have a shape corresponding to the shape of the mounting hole 531.

Meanwhile, in order to enable the camera 700 to be easily mounted to the third frame 530, a rail groove 531a may be formed at the mounting groove 531. The camera 700 may be formed with a rail having a shape corresponding to that of the rail groove 531a. As the rail of the camera 700 is mounted in the rail groove 531a, the camera 700 may be stably mounted to the third frame 530.

Meanwhile, a circuit board, which electrically connects the camera 700 and the driver 100, may be disposed at the third frame 530. Sockets (not shown) for electrical connection between the circuit board and the camera 700 may be formed at the circuit board and the camera 700, respectively.

Such sockets are provided to be detachably attached to each other. Accordingly, when the camera 700 is mounted to the third frame 530, the camera 700 and the circuit board disposed at the third frame 530 may be electrically connected to each other.

Meanwhile, in order to stably couple the camera 700 to the third frame 530, fasteners such as bolts, set screws, etc. may be used to fasten the camera 700 and the third frame 530. For coupling of such fasteners, for example, screw holes may be formed at the third frame 530.

Since the camera 700 is provided to be detachably attached to the third frame 530 in the embodiment, there is an effect of achieving easy repair or replacement of the camera 700.

Although several embodiments have been described herein, there may further be various embodiments. The technical contents of the above-described embodiments may be combined unless referred to the contrary, and new implementation forms may be embodied through such combination.

INDUSTRIAL APPLICABILITY

The triaxial rotation apparatus according to each embodiment may be used in aerial vehicles, etc.

The invention claimed is:
1. A triaxial rotation apparatus comprising:
a driver;
a first housing coupled to the driver;
a first motor disposed in a first housing;
a second motor disposed in a second housing;
a third motor disposed in a third housing;
a first connecting member disposed to surround a portion of the first motor while having a length greater than an outer periphery of the first motor;
a second connecting member disposed to surround a portion of the second motor while having a length greater than an outer periphery of the second motor; and
a third connecting member disposed to surround a portion of the third motor while having a length greater than an outer periphery of the third motor,
wherein the first connecting member is made of a flexible material, is disposed in the first housing, and is electrically connected to the driver,
wherein the first connecting member is a flexible printed circuit board, and electrically connects the driver and the first motor,
wherein the second connecting member is a flexible printed circuit board, and electrically connects the first motor and the second motor, and
wherein the third connecting member is a flexible printed circuit board, and electrically connects the second motor and the third motor.

2. The triaxial rotation apparatus according to claim 1, further comprising:
a first frame coupled to the first motor while being rotatable,
wherein the first connecting member comprises a first movable portion configured to be wound or unwound along and around the first motor in accordance with rotation of the first frame.

3. The triaxial rotation apparatus according to claim 2, wherein the first connecting member is connected, at one side thereof, to a connector while being connected, at the other side thereof, to a frame.

4. The triaxial rotation apparatus according to claim 2, further comprising:
a second frame coupled to the second motor while being rotatable; and
a third frame coupled to the third motor while being rotatable,
wherein:
the second connecting member comprises a second movable portion configured to be wound or unwound along and around the second motor in accordance with rotation of the second frame, and
the third connecting member comprises a third movable portion configured to be wound or unwound along and around the third motor in accordance with rotation of the third frame.

5. The triaxial rotation apparatus according to claim 4, wherein:
a second motor controller for controlling operation of the second motor is mounted to the first frame at a position corresponding to the second motor in a direction of a second axis; and
a third motor controller for controlling operation of the third motor is mounted to the second frame at a position corresponding to the third motor in a direction of a third axis.

6. The triaxial rotation apparatus according to claim 5, wherein:
the second motor controller comprises a first connector coupled to the first connecting member, and a second connector coupled to the second connecting member; and
the second connector is coupled to a portion of the second motor controller extending in the direction of the second axis in a bent state.

7. The triaxial rotation apparatus according to claim 5, wherein:
the third motor controller comprises a third connector coupled to the second connecting member, and a fourth connector coupled to the third connecting member; and
the fourth connector is coupled to a portion of the third motor controller extending in the direction of the third axis in a bent state.

8. The triaxial rotation apparatus according to claim 1, wherein the first connecting member includes a first movable portion configured to be wound or unwound along and around the first motor in accordance with rotation of the first frame,
wherein the second connecting member includes a second movable portion configured to be wound or unwound along and around the second motor in accordance with rotation of the second frame, and
wherein the third connecting member includes a third movable portion configured to be wound or unwound along and around the third motor in accordance with rotation of the third frame.

9. The triaxial rotation apparatus according to claim 8, wherein the first connecting member includes first fixed portions rotating in a state of being fixed to the first frame,
wherein the second connecting member includes second fixed portions rotating in a state of being fixed to the second frame, and
wherein the third connecting member includes third fixed portions rotating in a state of being fixed to the third frame.

10. A triaxial rotation apparatus comprising:
a first housing coupled to a driver;
a first motor disposed in a first housing;
a first frame rotatably coupled to the first motor;
a second housing coupled to the first frame;
a second motor disposed in the second housing;
a second frame rotatably coupled to the second motor;
a first connecting member disposed between the first motor and the first housing; and
a second connecting member disposed between the second motor and the second housing,
wherein the first connecting member is wound or unwound along and around the first motor in accordance with rotation of the first frame,
wherein the second connecting member is wound or unwound along and around the second motor in accordance with rotation of the second frame,
wherein the first connecting member is made of a flexible material, is disposed in the first housing, and is electrically connected to the driver,
wherein opposite ends of the first connecting member are respectively coupled to first frame and the second frame, and
wherein an angle between the opposite ends of the first connecting member is decreased or increased as the second frame rotates about a second axis with respect to the first frame.

11. The triaxial rotation apparatus according to claim 10, wherein the angle between both ends of the first connection portion increases, a wound central portion of the first connection member is tightened in circumferential and diametric directions of the corresponding motor such that the diameter thereof decreases.

12. The triaxial rotation apparatus according to claim 10, wherein the angle between both ends of the first connection portion decreases, a wound central portion of the first connection member is loosened in circumferential and diametric directions of the corresponding motor such that the diameter thereof increases.

* * * * *